May 31, 1932.  F. L. MAIN  1,861,019

ADJUSTABLE SPRING CLIP

Filed Aug. 17, 1927

Inventor

Frank L. Main

By Blackmore, Spencer & Hill

Attorneys

Patented May 31, 1932

1,861,019

UNITED STATES PATENT OFFICE

FRANK L. MAIN, OF JACKSON, MICHIGAN, ASSIGNOR TO GENERAL MOTORS CORPORATION, OF DETROIT, MICHIGAN, A CORPORATION OF DELAWARE

ADJUSTABLE SPRING CLIP

Application filed August 17, 1927. Serial No. 213,624.

This invention relates to snubbers or spring clip shock absorbers for leaf springs, and it is an object of this invention to provide a shock absorber of this type which is simple in construction and efficient in operation.

Shock absorbers of this general type which are now in use may be divided into two broad classes. The first class includes those which clamp the spring at two points in the same plane transversely of the spring, e. g. the C-clamp type. The second class includes those which clamp the spring at three points, one on the top and two on the bottom or vice versa. The objection to devices of the first class is that, while they exert a damping effect on the spring upon movement thereof in either direction, as is desirable, they exert this damping effect to substantially the same extent throughout the range of movement of the spring. The objection to devices of the second class is that, while the damping effect of the clip increases as the spring moves from its normal position in one direction, as is desirable, it allows free and unresisted movement thereof in the other direction. It is an object of this invention to provide a spring clip which combines the good qualities of both the clips described above and has none of the undesirable qualities of either.

Other objects of the invention will be apparent from the following description of the preferred embodiment of my invention which is shown in the accompanying drawings.

Figure 2:
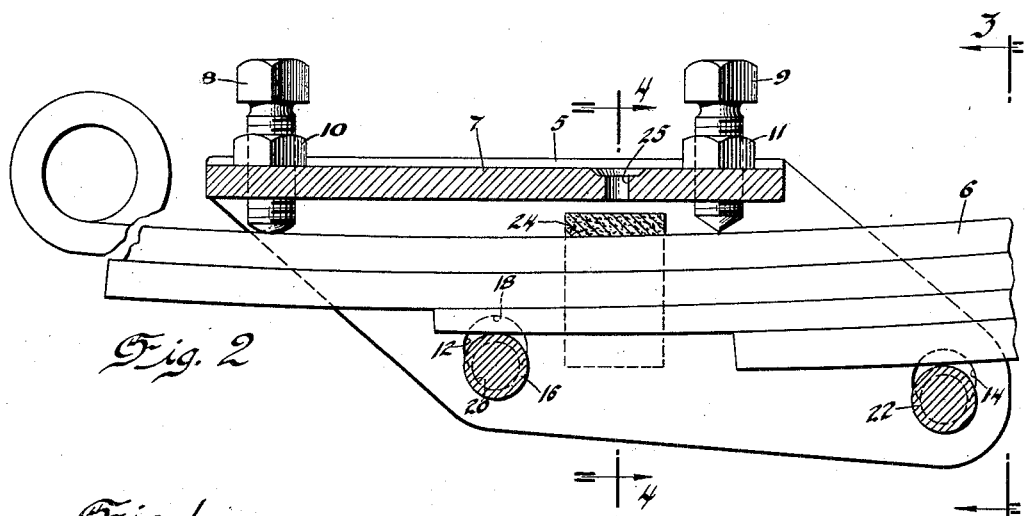
Figure 2 is a view, taken on the line 2—2 of Figure 3, showing the spring clip attached to a leaf spring.
Figure 3:
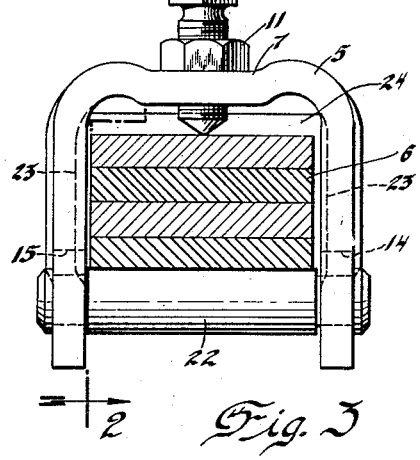
Figure 3 is a view taken on the line 3—3 of Figure 2.
Figure 4:
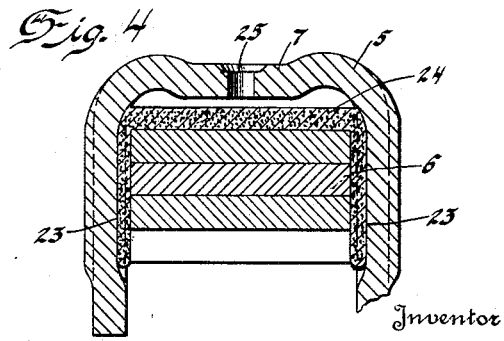
Figure 4 is a section taken on the line 4—4 of Figure 2.

My clip includes a body portion 5 which is channel-shaped in cross section and is adapted to be positioned on a leaf spring 6 near one end thereof, as shown in Figures 2, 3 and 4. In the web of the body portion there is provided a longitudinally extending, centrally disposed, depressed portion 7 through whose opposite ends extend set screws 8 and 9 on which are provided lock nuts 10 and 11, respectively. The set screw 8 has a rounded lower end and the set screw 9 a pointed lower end adapted to bear on the spring.

Figure 1:
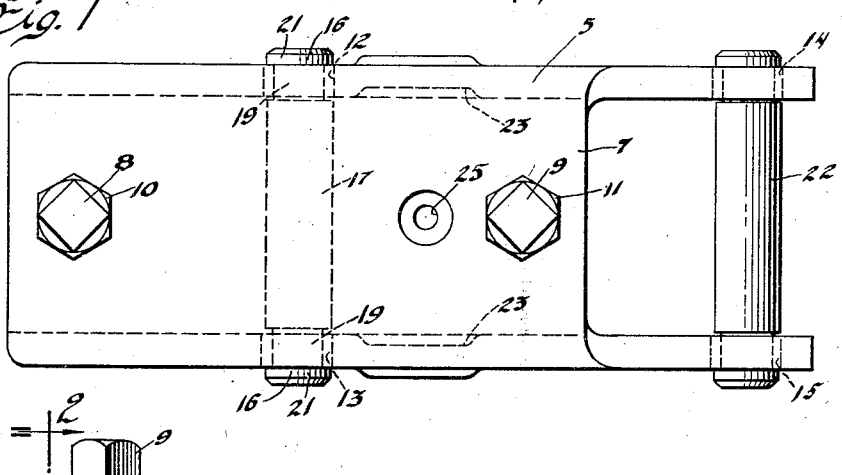
Figure 1 is a top plan view of my improved spring clip.

The flanges of the body portion are substantially rhomboidal in shape as shown in Figure 1. The flanges are provided with a pair of registering key-hole slots 12 and 13 adjacent one end and substantially midway between the set screws 8 and 9, and with another pair of registering key-hole slots 14 and 15 adjacent the other end and at substantially the same distance from the set screw 9 as the slots 12 and 13.

A pin 16 is adapted to bridge the channel and extend through both of the slots 12 and 13. The pin 16 has a central portion 17 of slightly smaller diameter than the larger upper portions 18 of the key-hole slots 12 and 13 and slightly shorter than the distance between the flanges. At each end this central portion is provided with a reduced neck 19 which is of slightly smaller diameter than the smaller lower portions 20 of the keyhole slots and is slightly longer than the thickness of the flange. The outer end of each neck is provided with a head 21 of substantially the same diameter as the central portion 17. This pin is adapted to be inserted through the larger upper portions of the slots 12 and 13 until its necks register with the flanges when it will drop down into position with the necks resting in the smaller lower portions of the key-hole slots, as shown in the drawings. As long as the clip is clamped on a spring or is in the position shown in the drawings, the pin 16 will remain in this position from which it cannot be removed by simple endwise movement but must first be lifted until the heads register with the larger upper portions of the key-hole slots and then moved endwise out of the slots. Another pin 22 which is adapted to bridge the channel and extend into the slots 14 and 15 is constructed and operates similarly to the pin 16. The construction described above constitutes a simple and efficient means for removably securing the clip on a spring.

Substantially midway between its ends each flange is provided with a depression 23 on its inner side. The reference character 24 indicates a strip of felt, whose ends are adapted to lie in the depressions between the sides of the spring and the clip with the intermediate portion lying on top of the spring to prevent rattling of the spring and clip, and provide a lubricant retainer for oil which may be poured through the hole 25 provided for that purpose in the web immediately above the felt strip.

In applying the clip to a spring, the pins 16 and 22 are removed and the body member 5 with the felt 24 therein placed over the spring, as shown in Figures 2, 3 and 4. The pins are then inserted in the slots and the clip adjusted to the desired position on the spring, which is preferably such that the set screw 8 is midway between the pin 16 and the spring shackle, with the pin 16 on the third, and the pin 22 on the fourth leaf from the top of the spring. The set screws 8 and 9 are then screwed up enough to give the desired amount of resistance.

In considering the operation of my clip two points should be borne in mind. One is that when a leaf spring flexes the leaves must move with respect to each other, i. e., slide on each other. The other is that the four points of contact of my clip with the spring form two substantially similar but reversed triangles 8—9—16 and 16—22—9. When the spring is under normal load, it is substantially flat and is quite easily flexed. But when the vehicle hits a bump the spring bows upwardly at all points intermediate its ends which of course includes the portion between the pins 16 and 22. This bowing action will obviously cause a greater pressure between the spring and the clip at the points of contact of the set screw 9, and the pins 16 and 22 with the spring. This will cause a greater pressure between the leaves of the spring which causes the friction between them to increase and, since the leaves must slide on each other for the spring to bow and it requires an increasingly greater force to cause the leaves to slide on each other due to the fact that the more the spring is bowed the greater will be the inter-leaf friction caused by the clip, the clip will exert a snubbing action which increases with the degree of flexure of the spring. The action of the spring in coming out of the bowed condition will obviously be resisted by the snubbing action of the clip to a constantly decreasing extent. When the spring bows downwardly, as it usually does after bowing upwardly, a greater pressure will be set up between the spring and the clip at the points of contact of the set screws 8 and 9 and the pin 16 with the spring. This will cause the clip to exert a snubbing action similar to that exerted when the spring bowed upwardly. Thus my clip exerts snubbing action on the spring when it bows upwardly or downwardly and on return from either position.

The set screw 9 is pointed so that it can take a firm grip on the spring and prevent the clip moving bodily on the spring. But it is obvious that on bowing a portion of the spring must move longitudinally relative to the clip. In order to allow this freely, the spring should be able to move longitudinally relative to two of the three points of contact with the spring when bowing in either direction. On the upward bowing movement this longitudinal movement is obviously allowed at the points of contact of the spring with the pins 16 and 22, which may, if necessary, rotate on their bearings in the flanges. On the downward bowing movement the pin 16 is one of the points at which the movement is allowed and the set screw 8 is formed with a rounded end (as shown in Figure 2) in order to hinder as little as possible the necessary movement at this point.

The clamp is secured snugly to the spring in the normal position thereof and the amount of snubbing exerted by the clip can be regulated by adjusting the set screws 8 and 9. It is to be noted that the snubbing action in one direction can be adjusted independently of that in the other direction since both of the set screws are adjustable.

My clip besides checking the flex and reflex action of the spring also makes it possible to break up synchronization between the four springs on an automobile chassis by adjusting the set screws on the clip on each spring so as to have a different degree of snubbing action on the individual springs to force them out of step when encountering an obstacle which would ordinarily cause a pitch or tramp.

I claim:

1. The combination of a leaf spring and a clip having contact with the spring at two points on each side thereof, one of said points of contact being relatively fixed with respect to the spring and the other three being movable with respect to the spring.

2. In a spring clip, a channel shaped body member having key-hole slots in its flanges, and a pin having a reduced neck fitting into the slots.

3. In a spring clip, a body member channel-shaped in cross section, a set screw having a rounded end threaded through the web of the channel adjacent one end thereof, a set screw having a pointed end threaded through the web of the channel adjacent the other end thereof, a removable pin bridging the flanges of the channel intermediate the two set screws, and a second removable pin bridging the flanges of the channel.

4. In combination with a supporting spring having a plurality of superposed leaves, means for automatically increasing the interleaf friction of the spring at an increasing rate as the spring is flexed in either direction from its normal load position, including a member provided with portions contacting the spring at four points when the spring is in normal load position, two of said portions being located on each side of the spring and all of said portions being in substantially different planes transversely of the spring.

5. In combination with a supporting spring having a plurality of superposed leaves, means for automatically increasing the interleaf friction of the spring at an increasing rate as the spring is flexed in either direction from its normal load position, including a member provided with portions contacting the spring at four points when the spring is in normal load position, two of said portions being located on each side of the spring, one of said lower portions being intermediate the two upper portions and one of the upper portions being intermediate the two lower portions longitudinally of the spring.

6. In combination with a supporting spring having a plurality of superposed leaves, means for automatically increasing the interleaf friction of the spring at an increasing rate as the spring is flexed in either direction from its normal load position, including a member provided with portions contacting the spring at four points when the spring is in normal load position, two of said portions being located on each side of the spring and said portions being so located that one of the upper portions and the two lower portions and one of the lower portions and the two upper portions define the vertices of two substantially similar but reversed triangles.

7. In combination, a spring having a plurality of superposed leaves, means for automatically varying the interleaf friction of the spring as it is flexed from its normal load position, including a U-shaped member straddling said spring, means extending between the legs of said U-shaped member and engaging the outer face of one of the leaves, and a pair of members extending through the connecting portion of said U-shaped member and each engaging the outer face of another of the leaves, said last-mentioned members being separately adjustable to vary the initial pressure between the spring leaves.

8. In combination, a spring having a plurality of superposed leaves, means for automatically varying the interleaf friction of the spring as it is flexed from its normal load position, including a U-shaped member straddling said spring, a pair of members extending through the legs of said U-shaped member and each engaging the outer face of one of the leaves, and means extending through the connecting portion of the U-shaped member and engaging the outer face of another of the leaves, said last-mentioned means being adjustable to vary the initial pressure between the leaves of the spring.

9. In combination, a spring having a plurality of superposed leaves, means for automatically varying the interleaf friction of the spring as it is flexed in either direction from its normal load position, including a U-shaped member straddling said spring, a pair of members extending through the legs of said U-shaped member and each engaging the outer face of one of the leaves, and a pair of members extending through the connecting portion of said U-shaped member and each engaging the outer face of another of the leaves, said last-mentioned members being separately adjustable to vary the initial pressure between the spring leaves.

10. In combination, a spring having a plurality of superposed leaves and means for automatically varying the interleaf friction of the spring as it is flexed in either direction from its normal load position, including a U-shaped member straddling the spring, means extending between the legs of said U-shaped member and engaging the outer face of one of the leaves, and a pair of members extending through the connecting portion of said U-shaped member, one of said last-mentioned members frictionally engaging the outer face of another of the leaves of the spring so as to prevent movement of said U-shaped member on the spring, the other of said last-mentioned members engaging a leaf of the spring and being adapted to slide on the surface thereof where the spring flexes.

11. In a device of the class described, a channel-shaped member, a pair of longitudinally spaced members extending between the flanges of said channel, and a pair of longitudinally spaced members extending through the web of said channel-shaped member.

12. In a device of the class described, a channel-shaped member, a pair of longitudinally spaced members extending between the flanges of said channel-shaped member, and a pair of longitudinally spaced members extending through the web of said channel-shaped member, each of said last-mentioned members being in a different plane transversely of the channel-shaped member.

13. In a device of the class described, a channel-shaped member, a pair of longitudinally spaced members extending between the flanges of said channel-shaped member, a pair of longitudinally spaced members extending through the web of said channel-shaped member, one of said last-mentioned members being located intermediate the two second-mentioned members and one of the two second-mentioned members being located intermediate the two last-mentioned members longitudinally of the channel-shaped member.

14. In a device of the class described, a channel-shaped member, a pair of longitudinally spaced members extending between the flanges of said channel-shaped member, and a pair of longitudinally spaced members extending through the web of said channel-shaped member, one of the second-mentioned members and the two last-mentioned members and one of the last-mentioned members and the two second-mentioned members defining the vertices of two substantially similar but reversed triangles.

15. The combination with a supporting spring having a plurality of superposed leaves of a member provided with portions contacting the spring at four points when the spring is in normal load carrying position: two of said portions being located on each side of the spring and all of said portions being in substantially different planes transversely of the spring, one of said intermediate portions being relatively fixed with respect to the spring.

16. The combination with a supporting spring having a plurality of superposed leaves of a member provided with portions contacting the spring at four points when the spring is in normal load carrying position: two of said portions being located on each side of the spring and said portions being so located that one of the upper portions and the two lower portions and one of the lower portions and the two upper portions define the vertices of two substantially similar but reversed triangles, one of said intermediate portions being relatively fixed with respect to the spring.

17. The combination with a supporting spring which includes a plurality of superposed leaves, of means for automatically increasing the interleaf friction of the spring as the spring is flexed, and for supplying lubricant to the spring including a clip having a portion substantially parallel with the faces of the leaves of the spring, and portions on opposite sides of the leaves, and a lubricant retaining member extending between the last-mentioned portions and the spring and between the first-mentioned portion and the spring, but spaced from the first-mentioned portion.

18. The combination with a supporting spring which includes a plurality of superposed leaves, of means for automatically increasing the interleaf friction of the spring as the spring is flexed, and for supplying lubricant to the spring including a channel shaped clip having its web substantially parallel with the faces of the leaves of the spring, and its flanges located on opposite sides thereof, a lubricant retaining member extending between the flanges and the spring and between the spring and the web, but spaced from the latter, and an opening extending through the web and through which lubricant may be supplied to the lubricant retaining member.

In testimony whereof I affix my signature.

FRANK L. MAIN.